Dec. 11, 1923.
L. FRITZ
EDUCATIONAL BLOCK
Filed Jan. 5, 1922
1,477,255
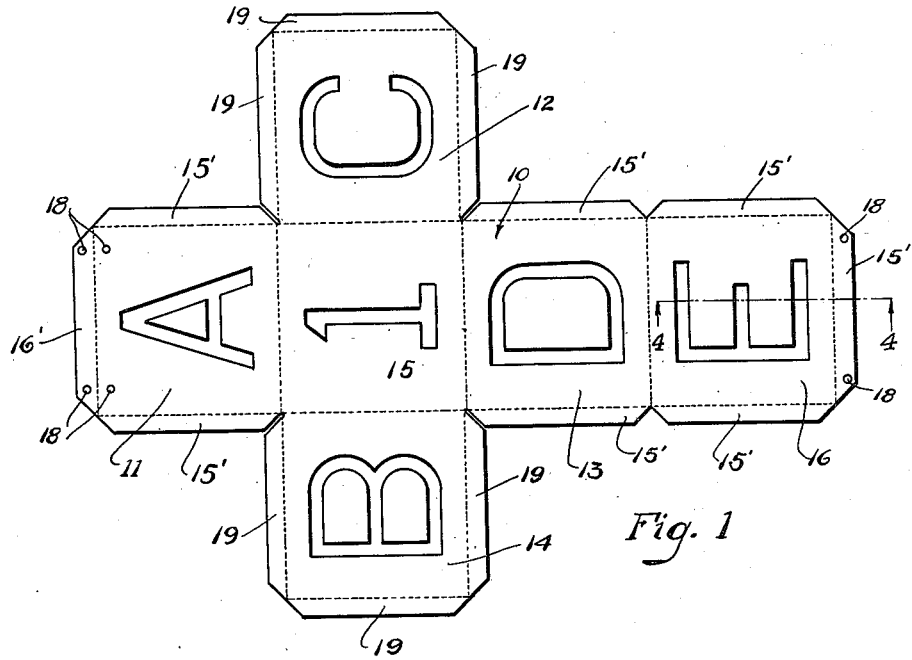
Fig. 1
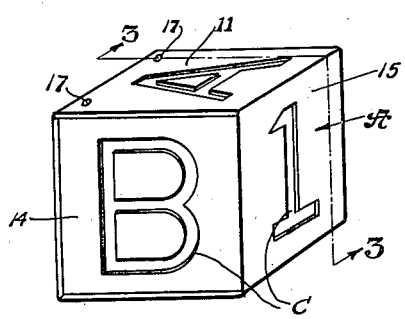
Fig. 2
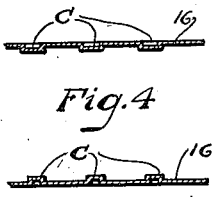
Fig. 4
Fig. 5
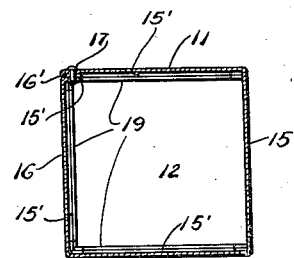
Fig. 3
Fig. 2a
Fig. 2b
| BLOCK | LETTERS | | BLOCK | LETTERS | |
|---|---|---|---|---|---|
| 1 | A B C D E | | 14 | N O P Q R |
| 2 | B C D E F | | 15 | O P Q R S |
| 3 | C D E F G | | 16 | P Q R S T |
| 4 | D E F G H | | 17 | Q R S T U |
| 5 | E F G H I | | 18 | R S T U V |
| 6 | F G H I J | | 19 | S T U V W |
| 7 | G H I J K | | 20 | T U V W X |
| 8 | H I J K L | | 21 | U V W X Y |
| 9 | I J K L M | | 22 | V W X Y Z |
| 10 | J K L M N | | 23 | W X Y Z A |
| 11 | K L M N O | | 24 | X Y Z A B |
| 12 | L M N O P | | 25 | Y Z A B C |
| 13 | M N O P Q | | 26 | Z A B C D |
FIG. 6.
Witnesses:
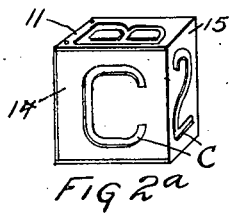
Inventor
Lewis Fritz
By Joshua R H Potts
His Attorney Patented Dec. 11, 1923.

1,477,255

UNITED STATES PATENT OFFICE.

LEWIS FRITZ, OF CHICAGO, ILLINOIS.

EDUCATIONAL BLOCK.

Application filed January 5, 1922. Serial No. 527,079.

*To all whom it may concern:*

Be it known that I, LEWIS FRITZ, a citizen of the United States, and a resident of the city of Chicago, county of Cook, and State of Illinois, have invented certain new and useful Improvements in Educational Blocks, of which the following is a specification.

My invention relates to improvements in educational blocks and has for its principal object the provision of an improvement of this character which will be highly efficient in use.

A further object of the invention is the provision of a set of educational blocks, consisting of twenty-six blocks, numbered from 1 to 26, said numbers being associated with the letters of the alphabet, whereby a child being taught the alphabet can be able to associate the letters of the alphabet with their numerical standing.

Other objects will appear hereinafter.

The invention consists in the combinations and arrangements of parts hereinafter described and claimed.

The invention will be best understood by reference to the accompanying drawings forming a part of this specification, and in which, Fig. 1 is a blank form from which each of the blocks, comprising the set, are formed;

Fig. 2 is a perspective view of one of the blocks;

Figs. 2ª and 2ᵇ are perspective views of two blocks embodied in the invention similar to that illustrated in Fig. 2;

Fig. 3 is a sectional detail view of the same, taken substantially on line 3—3 of Fig. 2;

Fig. 4 is a fragmentary sectional detail view, of the same, taken substantially on line 4—4 of Fig. 1, showing an impressed letter;

Fig. 5 is a fragmentary sectional detail view similar to that shown in Fig. 4 but showing an embossed letter; and Fig. 6 is a table showing the numbers of each block and the associated letter together with the next four succeeding letters of the alphabet which are either impressed or embossed.

The preferred form of construction, as illustrated in the drawings, comprises a block "A" formed from a blank 10 which is struck or stamped from a single piece of metallic resilient material. The blank 10 comprises side walls 11, 12, 13, and 14 and top walls 15 and 16 respectively. The side walls 11 and 13 and the bottom wall 16 are provided with integral lateral flanges 15' and 16', which are bent back upon the inner surfaces of the said side walls and top wall to obviate sharp edges, which otherwise would be injurious to the child handling the blocks. The side walls 11 and 13 are bent substantially at right angles with respect to the top wall 15, and the bottom wall 16 is bent at right angles with respect to the side wall 13, thus forming the top and bottom and two side walls of the block. The bottom wall 16, of the block, when properly bent in its respective position, is fixedly secured to the lateral flange 16', which is bent substantially at right angles with respect to the side wall 11, by suitable rivets 17 which pass through apertures 18. The side walls 12 and 14 are also provided with integral lateral flanges 19 which are bent inwardly substantially at right angles with respect to the said side walls. The side walls 12 and 14, like the other side walls of the block, are bent at right angles with respect to the top wall 15. When the side walls 12 and 14 are bent in their respective positions, the flanges 19, being of a resilient material, frictionally engaging the adjacent inner surfaces of the side walls 11 and 12 and the bottom wall 16, retain the side walls 12 and 14 in their respective position. By the construction of a block, as herein set forth, it will be obvious that there are no sharp corners or edges, by which the child playing with the blocks, can be injured.

The set of blocks consists of twenty-six blocks, each similar to the construction, as herein set forth, and each bearing numerals "C" associated with the letters of the alphabet. The numerals and letters of the alphabet can either be impressed or embossed, as desired.

The table illustrated in Fig. 6, of the drawing, sets forth the alphabetical arrangement which each respective block bears, for example, block #1 will bear the letters A, B, C, D and E and block #2 (Fig. 2ª) will bear the letters B, C, D, E and F, and block #3 (Fig. 2ᵇ) will bear the letters C, D, E, F, and G, and so on, the table being printed on a suitable card and sold with each block set to serve as a guide and which will enable one not familiar with the numerical arrangement of the letters of the alphabet to associate the numbers therewith.

By my improved educational blocks when teaching a child the alphabet, the child first becomes familiar with the numerals from 1 to 26 and then is taught to associate the numerals with the letters of the alphabet. In order to aid or simplify associating the number of each block with the letter on that block to which it relates, in the matter of identifying the letter's numerical standing in the alphabet, in the case of each block the letter impressed in the wall adjacent the head of the number is the letter of that block to which the number relates, the rule of governing the association of the number with its respective letter being fully set forth in a book of rules which it is intended will be sold with the blocks. In this way I provide educational blocks which will be a great help in teaching a child to spell such words as are used in the primary grades of a school, as well as teaching the child to associate the letters of the alphabet with their numerical standings.

While I have illustrated and described the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claims.

Having described my invention, what I claim as new and desire to secure by Letters Patent is:

1. Educational blocks each formed from a blank including side, top and bottom walls bent substantially at right angles with respect to each other, a number on one of the walls, and letters of the alphabet on the other walls, the alphabetical numerical relation of the letter on the wall adjacent the head of the number being designated by said number.

2. Educational blocks each formed from a blank including side, top and bottom walls and having lateral flanges on the side walls arranged to frictionally engage the other of the walls when said walls are bent substantially at right angles with respect to each other, a number on one of the walls, and letters of the alphabet on the other of the walls, the alphabetical numerical relation of the letter on the wall adjacent the head of the number being designated by said number.

3. Educational blocks each including side, top and bottom walls, a number on one of the walls, and letters of the alphabet on the other walls, the alphabetical numerical relation of the letter on the wall adjacent the head of the number being designated by said number.

4. An educational block formed from a blank including side, top and bottom walls and flanges on the side walls, the flanges being bent substantially at right angles with respect to the side walls adapted to frictionally engage the other of the walls when the walls are bent substantially at right angles with respect to each other, and pin members passing through two of the walls and provided with rivet shaped heads for securing the walls in cube form, and letters of the alphabet on the walls.

In testimony whereof I have signed my name to this specification in the presence of the two subscribing witnesses.

LEWIS FRITZ.

Witnesses:
FREDA C. APPLETON,
JOSHUA R. H. POTTS.